(12) United States Patent
Tuttle (10) Patent No.: US 7,046,510 B2
(45) Date of Patent: May 16, 2006

(54) TECHNIQUE FOR MOUNTING A POWER SUPPLY IN A COMPUTER

(75) Inventor: Erick J. Tuttle, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 79 days.

(21) Appl. No.: 10/897,850

(22) Filed: Jul. 23, 2004

(65) Prior Publication Data

US 2006/0018090 A1    Jan. 26, 2006

(51) Int. Cl.
*G06F /16* (2006.01)
(52) U.S. Cl. ....................... 361/683; 361/679
(58) Field of Classification Search ................ 361/679, 361/683, 686
See application file for complete search history.

(56) References Cited

U.S. PATENT DOCUMENTS

| | | | | |
|---|---|---|---|---|
| 5,030,128 A | * | 7/1991 | Herron et al. .............. | 439/372 |
| 5,224,024 A | * | 6/1993 | Tu et al. ...................... | 361/831 |
| 5,715,139 A | * | 2/1998 | Nakajima .................... | 361/683 |
| 6,459,589 B1 | * | 10/2002 | Manweiler et al. .......... | 361/752 |
| 6,819,560 B1 | * | 11/2004 | Konshak et al. ............ | 361/687 |
| 6,906,914 B1 | * | 6/2005 | Stamos et al. .............. | 361/683 |
| 2005/0111200 A1 | * | 5/2005 | Hardt et al. ................. | 361/727 |
| 2005/0254210 A1 | * | 11/2005 | Grady et al. ................ | 361/695 |

* cited by examiner

*Primary Examiner*—Yean-Hsi Chang
(74) *Attorney, Agent, or Firm*—Kevin M. Hart (57) ABSTRACT

A computer according to a preferred embodiment of the invention may have a power supply mounted therein without the use of tool-requiring fasteners. A chassis of the computer may have a chassis hook and either a stop or an elastic catch. A power supply of the computer may have a power supply hook and either an elastic catch or a stop. When the power supply is mounted to the chassis, the power supply hook engages the chassis hook, and the elastic catch engages the stop in a manner that prevents the power supply hook from disengaging from the chassis hook.

28 Claims, 9 Drawing Sheets

TECHNIQUE FOR MOUNTING A POWER SUPPLY IN A COMPUTER

FIELD OF THE INVENTION

This invention relates to techniques for securing power supplies in computers.

BACKGROUND

The typical computer power supply is secured inside a chassis with the use of conventional screws, which require tools for installation and removal. For convenience of manufacture and maintenance, it would be desirable to mount a power supply inside a chassis either without the use of tools or with a minimum number of tool-requiring fasteners.

SUMMARY OF THE INVENTION

A computer according to a preferred embodiment of the invention may have a power supply mounted therein without the use of tool-requiring fasteners.

In one aspect, a computer according to a preferred embodiment of the invention includes a chassis having a chassis hook and either a stop or an elastic catch; and a power supply having a power supply hook and either an elastic catch or a stop. When the power supply is mounted to the chassis, the power supply hook engages the chassis hook, and the elastic catch engages the stop in a manner that prevents the power supply hook from disengaging from the chassis hook.

In another aspect, a computer power supply according to a preferred embodiment of the invention includes a power supply hook for engaging a chassis hook protruding inward from a first surface of a chassis; and either an elastic catch on the power supply for engaging a stop on the chassis or a stop on the power supply for engaging an elastic catch on the chassis.

In still another aspect, a computer chassis according to a preferred embodiment of the invention includes a chassis hook protruding inward from a surface of the chassis for engaging a power supply hook on a power supply; and either a stop on the chassis for engaging an elastic catch on the power supply or an elastic catch on the chassis for engaging a stop on the power supply.

DETAILED DESCRIPTION OF THE PREFERRED EMBODIMENTS

Figure 1:
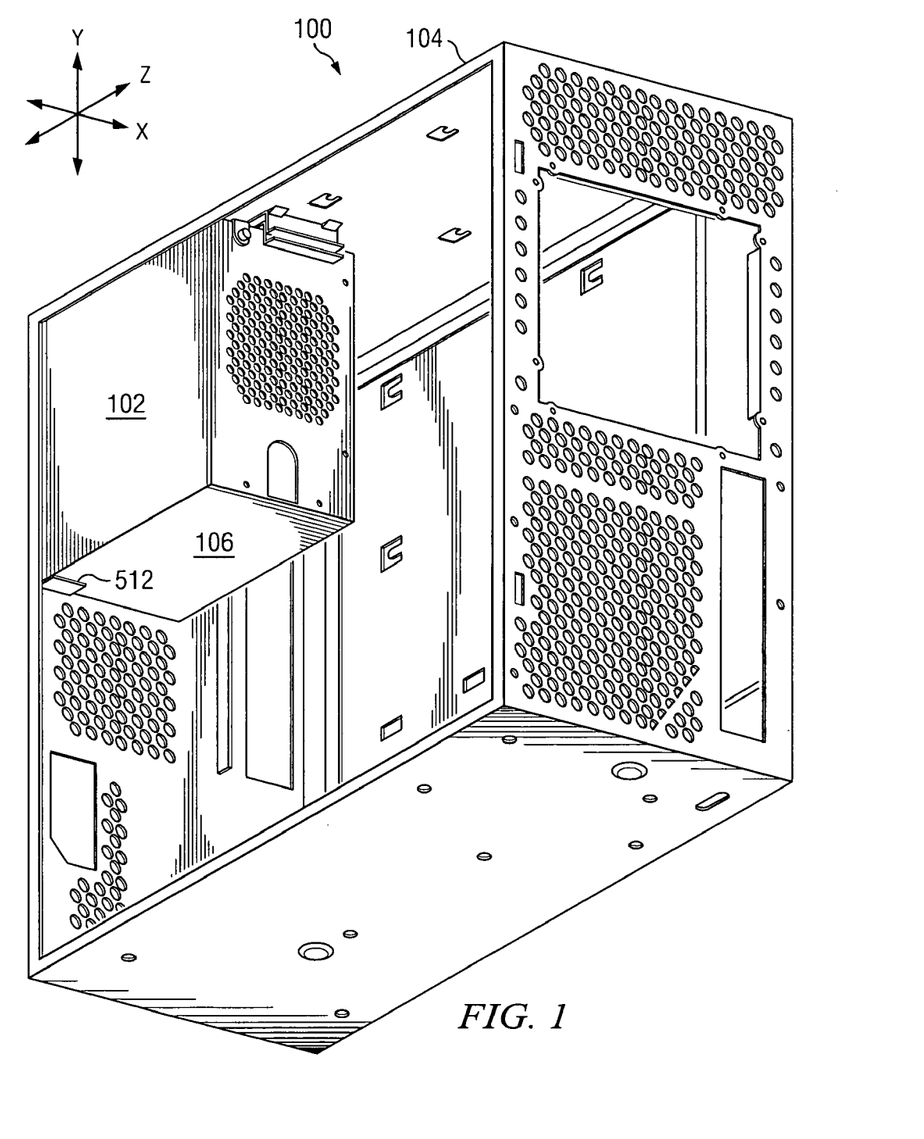
FIG. 1 is an oblique view of a computer chassis having a power supply mounted therein according to a preferred embodiment of the invention.
Figure 2:
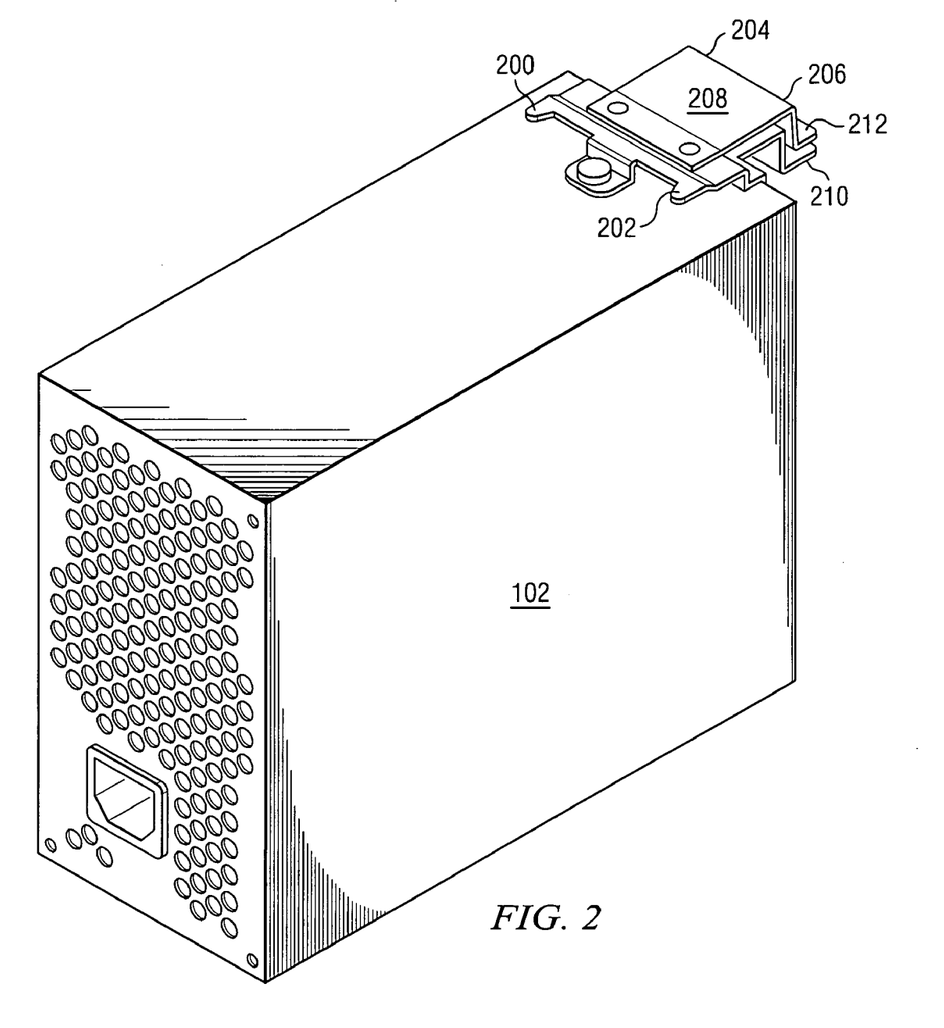
FIGS. 2, 3 and 4 are oblique, side and front views, respectively, of the power supply of FIG. 1.
Figure 3:
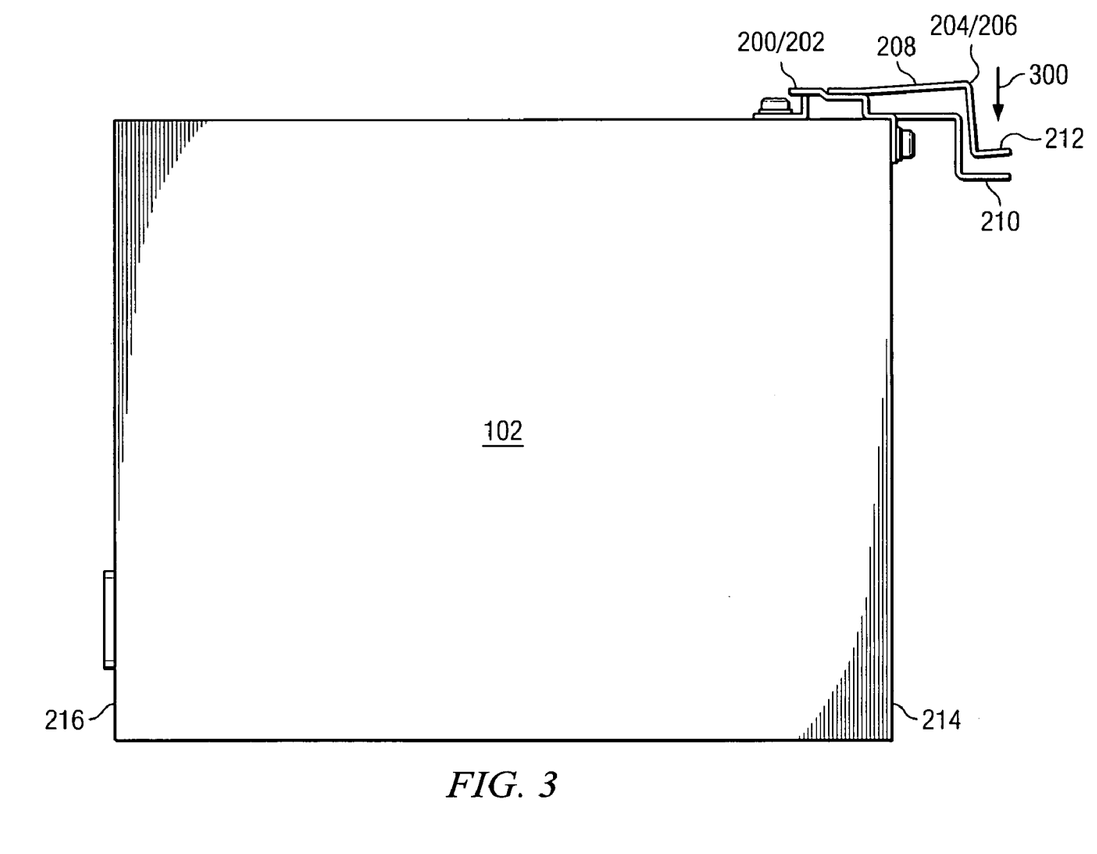
Figure 4:
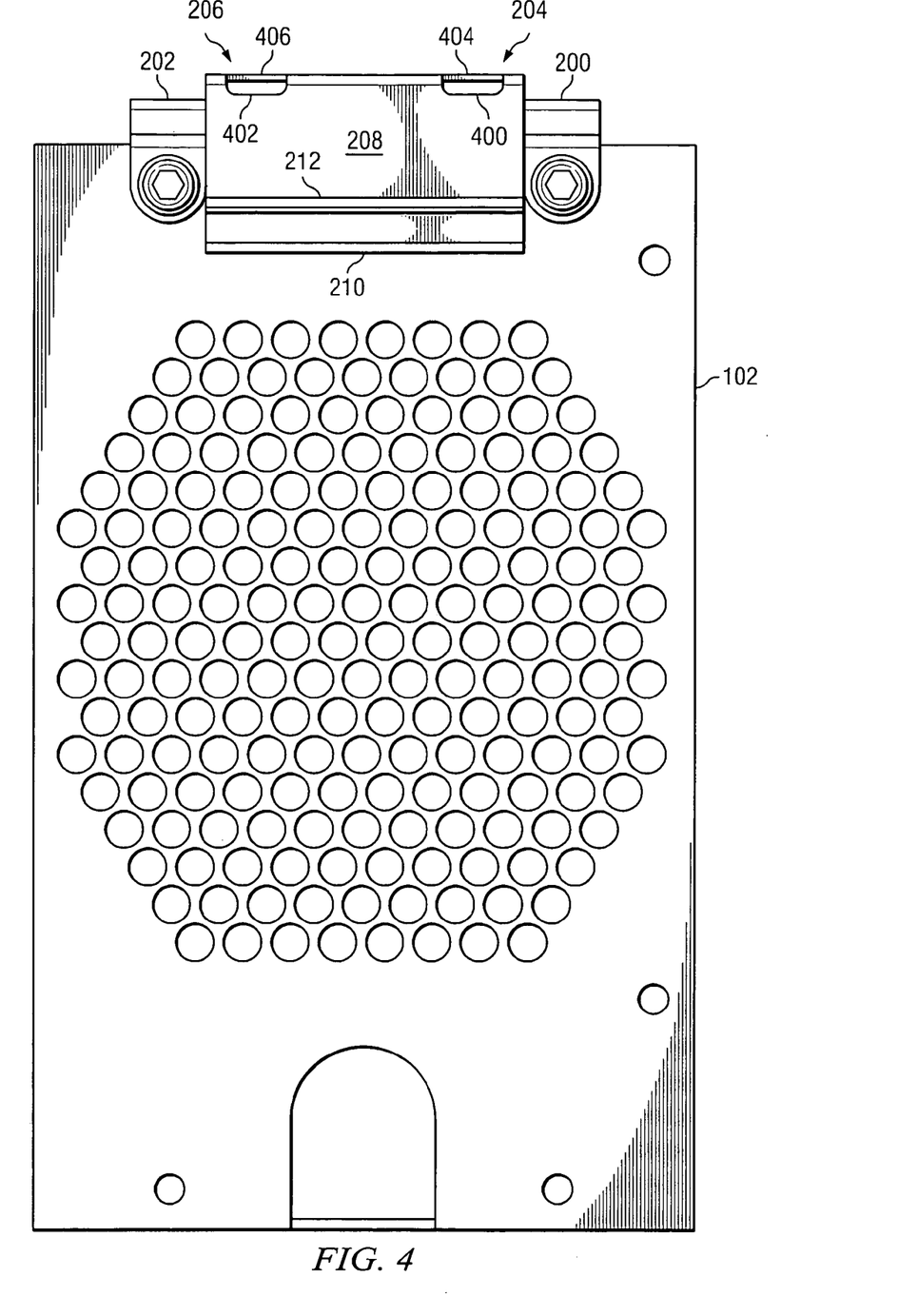
Figure 5:
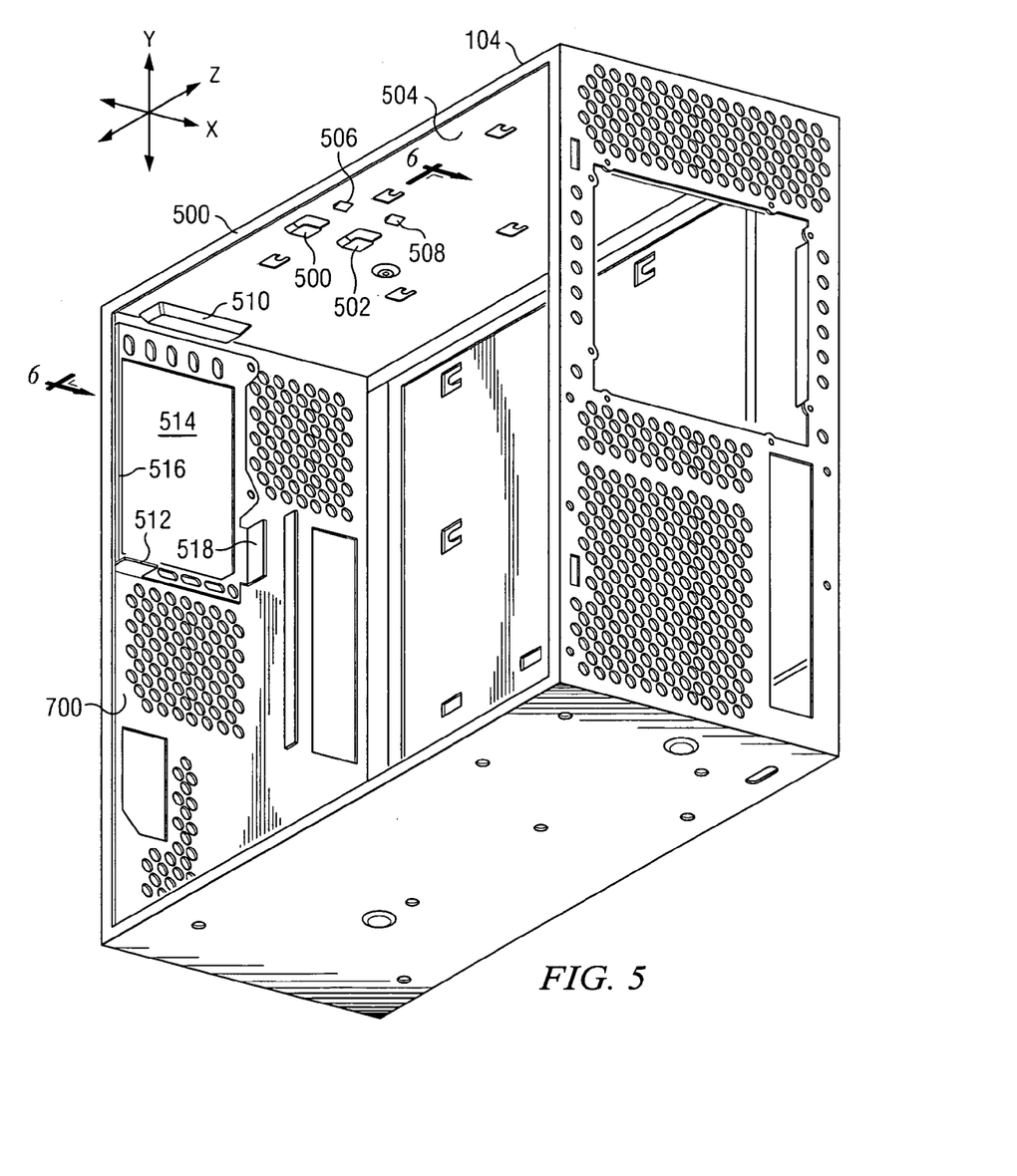
FIG. 5 is an oblique view of the chassis of FIG. 1 without the power supply mounted therein.
Figure 6:
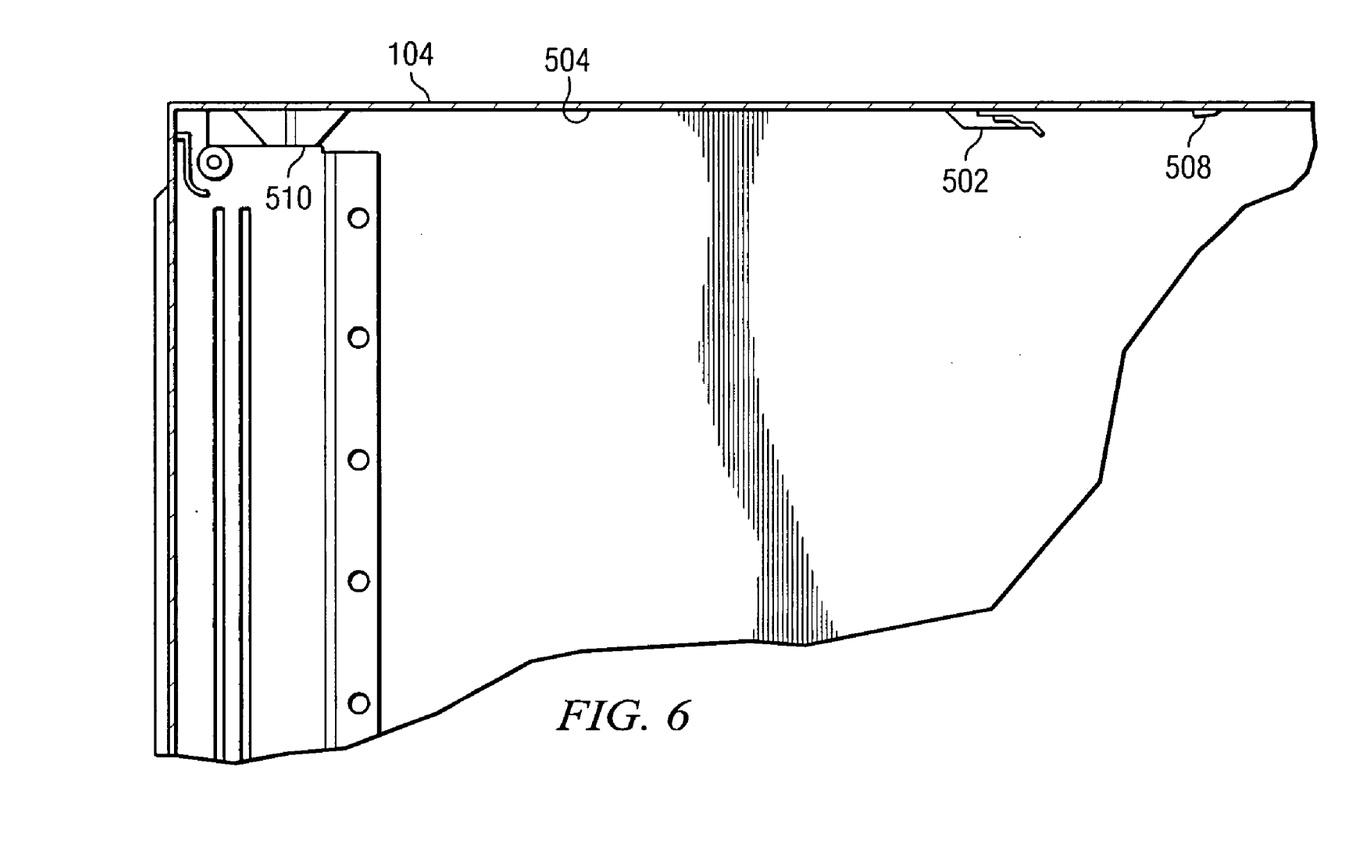
FIG. 6 is the sectional view indicated in FIG. 5.
Figure 7:
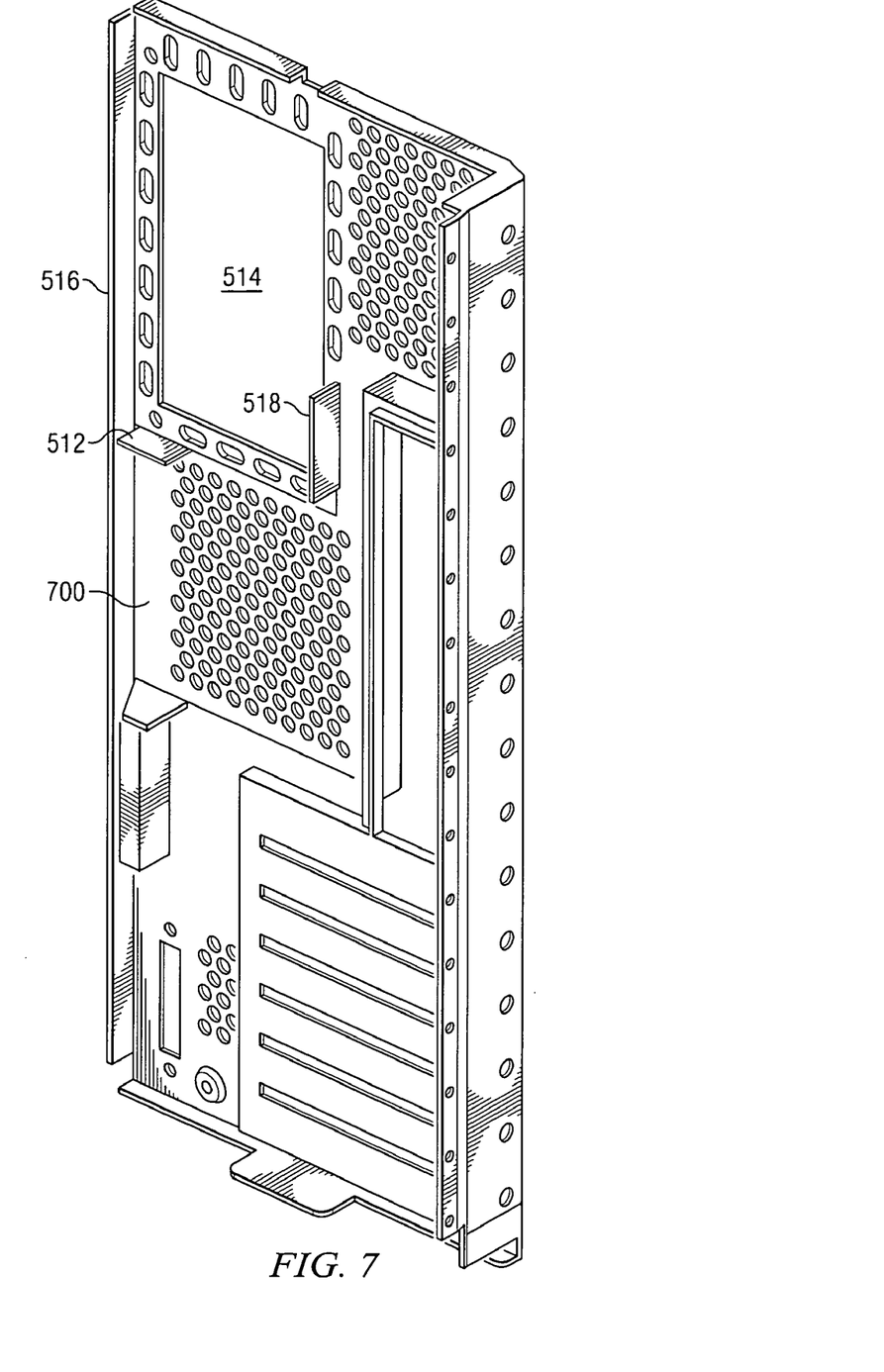
FIG. 7 is an oblique view of the rear wall of the chassis of FIG. 1.
Figure 8:
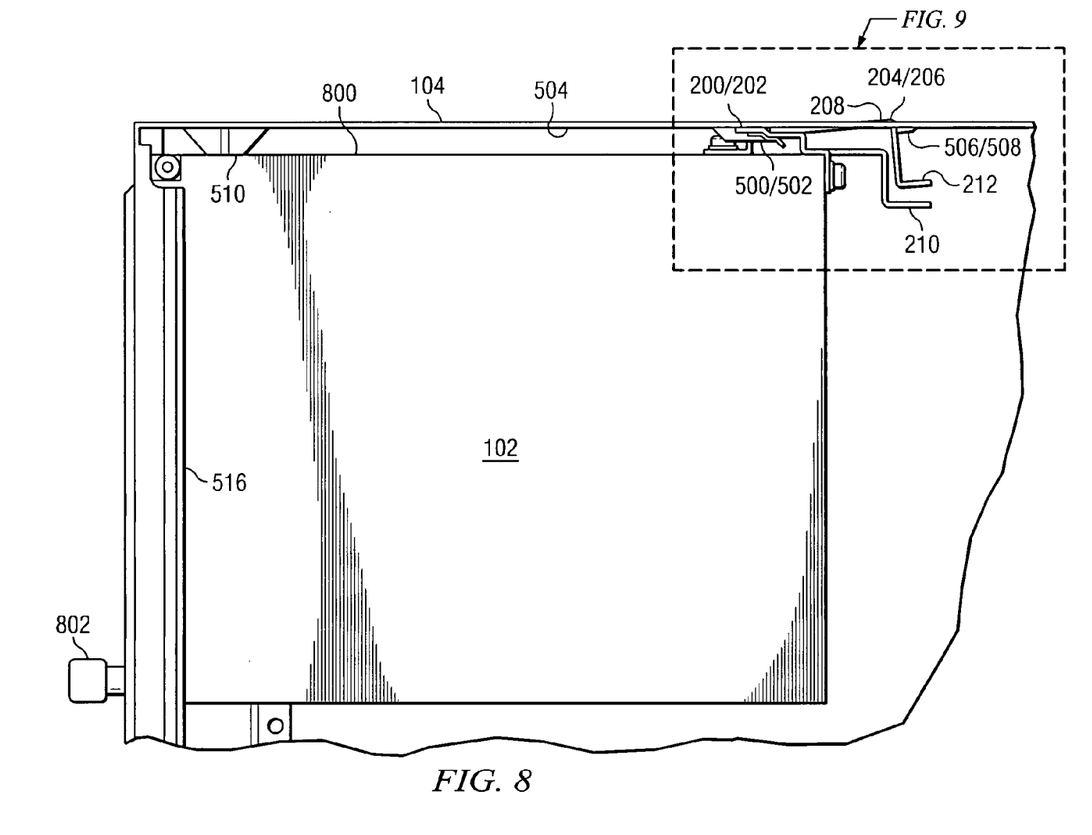
FIG. 8 is a side view of the chassis of FIG. 1 with the power supply mounted therein.
Figure 9:
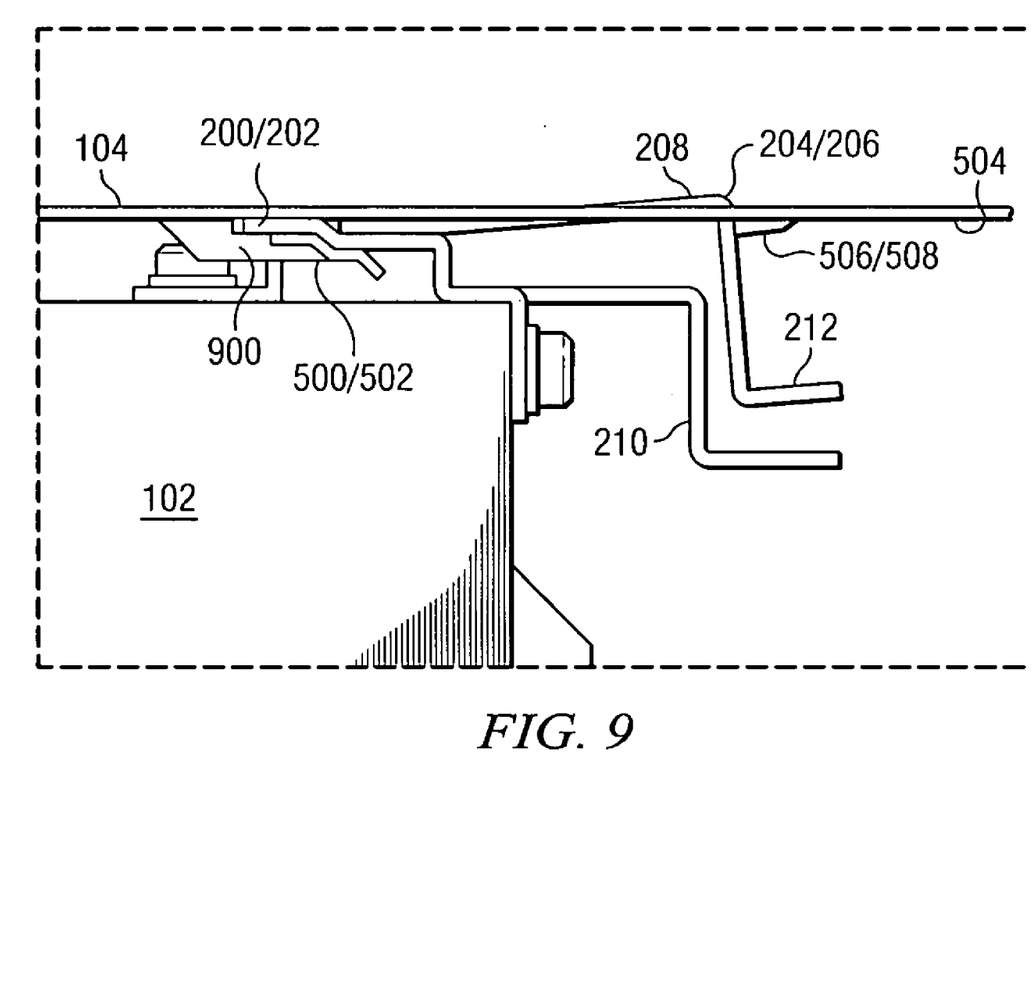
FIG. 9 is the close-up view indicated in FIG. 8.

FIG. 1 illustrates a computer 100 according to a preferred embodiment of the invention. Computer 100 includes a power supply 102 and a chassis 104. FIGS. 2–4 illustrate power supply 102 in detail. FIGS. 5–7 illustrate chassis 104 in detail. FIGS. 8–9 illustrate the mounting of power supply 102 to chassis 104 in detail.

Power supply 102 includes one or more power supply hooks 200, 202 and one or more elastic catches 204, 206. Power supply hooks 200, 202 may be constructed using any sufficiently rigid material such as steel. Likewise, elastic catches 204, 206 may be constructed using any elastic but sufficiently strong material. In the embodiment shown, catches 204, 206 constitute a bent edge of an elastic member 208. One suitable material for constructing elastic member 208 would be 0.5 mm-thick half-hard "303" stainless steel; other materials may be used. Rectangular holes 400, 402 may be formed at the bend so that sharp edges 404, 406 of elastic member 208 are exposed, thus creating more effective catching surfaces. A rigid member 210 may be provided under elastic member 208 so that a force 300 may be applied by holding rigid member 210 and pressing elastic member 208 toward rigid member 210. In response to force 300, elastic member 208 temporarily deforms toward rigid member 210. Elastic member 208 returns to its original position after force 300 is discontinued. To facilitate the application of force 300, a lip 212 may be provided on elastic member 208 as shown.

Chassis 104 includes one or more chassis hooks 500, 502 and one or more stops 506, 508. In the embodiment shown, chassis hooks 500, 502 and stops 506, 508 protrude inward from surface 504 of chassis 104. They may be constructed in a variety of ways. In the embodiment shown, they are integrally formed from the material of surface 504 by punching and deforming.

If, as in the embodiment shown, power supply hooks 200, 202 are disposed at one end 214 of power supply 102, then chassis 104 will need to provide additional support at the opposite end 216 of power supply 102. In such a case, a supporting mechanism may be provided on chassis 104 to restrain power supply end 216 in the x and y axes. (Axes are indicated in FIGS. 1 and 5.) The supporting mechanism may be constructed in a variety of ways. For example, a clearance hole 514 may be provided in chassis 104 for receiving all or a portion of end 216 of power supply 102. The perimeter edges of clearance hole 514 may engage corresponding side surfaces of power supply 102 so that the power supply is restrained from moving in the x and y axes when its end 216 is inserted in the hole. Alternatively or in addition to clearance hole 514, the inside of chassis 104 may simply include at least four rigid surfaces for engaging four side surfaces of power supply 102 and restraining the power supply in the x and y axes. Some or all of these rigid surfaces may constitute walls of chassis 104. Or, as in the illustrated embodiment, the rigid surfaces may be provided by protrusions extending inward from surfaces of chassis 102. For example, flange 512 and boss 510 may be provided to restrain power supply 102 in the y axis. And flanges 516 and 518, may be provided to restrain power supply 102 in the x axis.

To mount power supply 102 to chassis 104 without the use of tool-requiring fasteners, power supply 102 may be aligned with chassis 104 by holding power supply 102 adjacent to its final position, engaging boss 510 with surface 800 of power supply 102, and pressing elastic member 208 gently against surface 504 of chassis 104. Then, the user may slide power supply 102 toward surface 700 until power supply hooks 200, 202 engage chassis hooks 500, 502 and elastic catches 204, 206 engage stops 506, 508 as shown in FIGS. 8–9. In the drawing, elastic member 208 is shown protruding slightly outside chassis 104 once it is engaged with stops 506, 508. This need not be the case in every embodiment; rather, elastic member 208 may be entirely contained within chassis 104 if desired. The engagement between power supply hooks 200, 202 and chassis hooks 500, 502 prevents power supply 102 from moving in the x and y axes and in the negative z direction. (Either chassis hooks 500, 502 or power supply hooks 200, 202 may be closed on the sides as shown in FIG. 9 at 900 to help restrain the power supply against lateral movement.) And the engagement between catches 204, 206 and stops 506, 508 prevents power supply 102 from moving in the positive z direction, thereby preventing the hooks from becoming disengaged from one another. To provide additional restraint from movement, a thumbscrew 802 may optionally be inserted through chassis 104 and screwed into power supply 102 as shown in FIG. 8.

To unmount power supply 102 from chassis 104, force 300 may be applied to elastic member 208 to disengage catches 204, 206 from stops 506, 508. Once the catches have been disengaged from the stops, power supply 102 may be slid away from surface 700 to disengage power supply hooks 200, 202 from chassis hooks 500, 502.

While the invention has been described in detail in relation to a preferred embodiment thereof, the described embodiment has been presented by way of example and not by way of limitation. It will be understood by those skilled in the art that various changes may be made in the form and details of the described embodiment without deviating from the spirit and scope of the invention as defined by the appended claims. For example, although the illustrated embodiment shows one or more elastic catches 404, 406 on power supply 102 and stops 506, 508 on chassis 104, an alternative embodiment may have one or more elastic catches 404, 406 on chassis 104 and one or more stops 506, 508 on power supply 102. Other such alternative embodiments are possible and are within the scope of the appended claims.

What is claimed is:

1. A computer, comprising:
    a chassis having a first chassis hook and either a first stop or a first elastic catch; and
    a power supply having a first power supply hook and either the first elastic catch or the first stop;
    wherein, when the power supply is mounted to the chassis, the first power supply hook engages the first chassis hook, and the first elastic catch engages the first stop in a manner that prevents the first power supply hook from disengaging from the first chassis hook.

2. The computer of claim 1:
    wherein the first power supply hook is disposed at a first end of the power supply; and
    further comprising a supporting mechanism operable to restrain the power supply in two axes at a second end opposite the first end.

3. The computer of claim 2:
    wherein the supporting mechanism comprises a clearance hole in the chassis through which a portion of the second end of the power supply passes such that perimeter edges of the clearance hole engage side surfaces of the power supply.

4. The computer of claim 2, wherein:
    the power supply comprises four side surfaces; and
    the supporting mechanism comprises four rigid surfaces inside the chassis, each of the four rigid surfaces engaging one of the four side surfaces of the power supply.

5. The computer of claim 4, wherein the four rigid surfaces comprise protrusions extending inward from surfaces of the chassis.

6. The computer of claim 5, wherein the protrusions comprise:
    three flanges for engaging three of the four side surfaces and a boss for engaging the fourth side surface.

7. The computer of claim 1, wherein:
    the first chassis hook is integrally formed from a portion of the chassis.

8. The computer of claim 1, wherein:
    the first stop is integrally formed from a portion of the chassis.

9. The computer of claim 1, wherein:
    the chassis further comprises a second chassis hook and either a second stop or a second elastic catch;
    the power supply further comprises a second power supply hook and either the second elastic catch or the second stop; and
    when the power supply is mounted to the chassis, the second power supply hook engages the second chassis hook, and the second elastic catch engages the second stop.

10. The computer of claim 1, wherein:
    the first elastic catch comprises a bent edge of an elastic member.

11. The computer of claim 10, wherein:
    the bent edge comprises a rectangular hole such that a sharp edge of the elastic member is exposed to the first stop.

12. The computer of claim 10, further comprising:
    a rigid member disposed adjacent the elastic member such that a force may be applied by holding the rigid member and pressing the elastic member toward the rigid member to disengage the first elastic catch from the first stop.

13. The computer of claim 10, further comprising:
    a lip on the elastic member against which a force maybe applied to disengage the first elastic catch from the first stop.

14. A computer power supply, comprising:
    a first power supply hook for engaging a first chassis hook protruding inward from a first surface of a chassis; and
    either a first elastic catch on the power supply for engaging a first stop on the chassis or a first stop on the power supply for engaging a first elastic catch on the chassis.

15. The computer power supply of claim 14, further comprising:
    a second power supply hook for engaging a second chassis hook protruding inward from the first surface of the chassis; and
    either a second elastic catch on the power supply for engaging a second stop on the chassis or a second stop on the power supply for engaging a second elastic catch on the chassis.

16. The computer power supply of claim 14, wherein:
    the first catch comprises a bent edge of an elastic member.

17. The computer power supply of claim 16, wherein:
    the bent edge comprises a rectangular hole such that a sharp edge of the elastic member is exposed to the first stop.

18. The computer power supply of claim 16, further comprising:
a rigid member disposed on the power supply adjacent the elastic member such that a force may be applied by holding the rigid member and pressing the elastic member toward the rigid member to disengage the first catch from the first stop.

19. The computer power supply of claim 16, further comprising:
a lip on the elastic member against which a force maybe applied to disengage the first catch from the first stop.

20. A computer chassis, comprising:
a first chassis hook protruding inward from a first surface of the chassis for engaging a first power supply hook on a power supply; and
either a first stop on the chassis for engaging a first elastic catch on the power supply or a first elastic catch on the chassis for engaging a first stop on the power supply.

21. The computer chassis of claim 20:
wherein the first power supply hook is disposed at a first end of the power supply; and
further comprising a supporting mechanism on the chassis operable to restrain the power supply in two axes at a second end opposite the first end.

22. The computer chassis of claim 21:
wherein the supporting mechanism comprises a clearance hole in the chassis through which a portion of the second end of the power supply passes such that perimeter edges of the clearance hole engage side surfaces of the power supply.

23. The computer chassis of claim 21, wherein:
the power supply comprises four side surfaces; and
the supporting mechanism comprises four rigid surfaces inside the chassis, each of the four rigid surfaces engaging one of the four side surfaces of the power supply.

24. The computer chassis of claim 23, wherein the four rigid surfaces comprise protrusions extending inward from surfaces of the chassis.

25. The computer chassis of claim 24, wherein the protrusions comprise:
three flanges for engaging three of the four side surfaces and a boss for engaging the fourth side surface.

26. The computer chassis of claim 20, further comprising:
a second chassis hook protruding inward from a first surface of the chassis for engaging a second power supply hook on the power supply; and
either a second stop on the chassis for engaging a second elastic catch on the power supply or a second elastic catch on the chassis for engaging a second stop on the power supply.

27. The computer chassis of claim 20, wherein:
the first chassis hook is integrally formed from a portion of the first surface of the chassis.

28. The computer chassis of claim 20, wherein:
the first stop is integrally formed from a portion of the first surface of the chassis.

* * * * *